June 10, 1930.                W. O. VIVARTTAS                1,763,333
                                 MULTIPLE GAUGE
                              Filed May 4, 1927         3 Sheets-Sheet 1
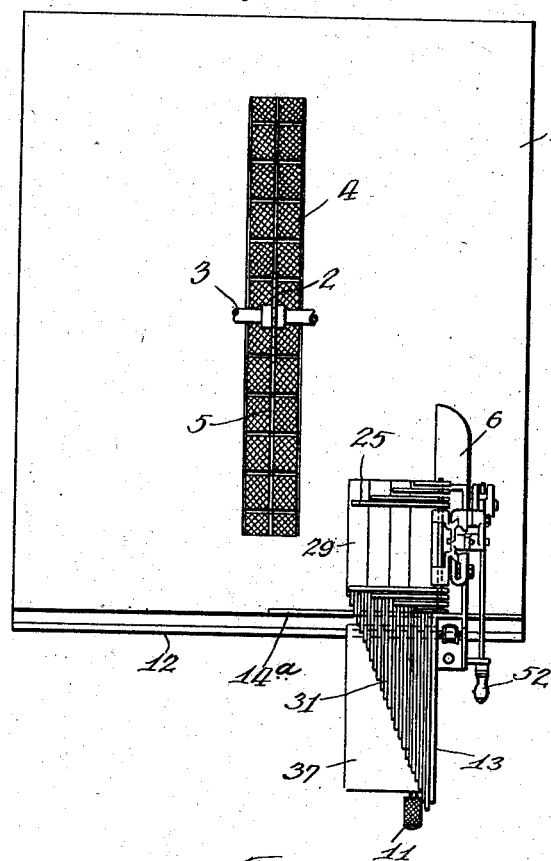
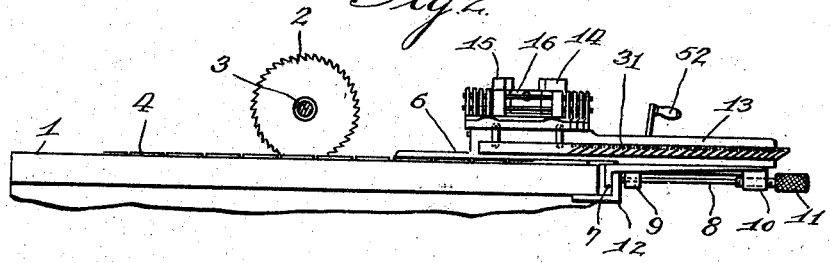
Inventor:
William O. Vivarttas June 10, 1930. W. O. VIVARTTAS 1,763,333
MULTIPLE GAUGE
Filed May 4, 1927 3 Sheets-Sheet 2
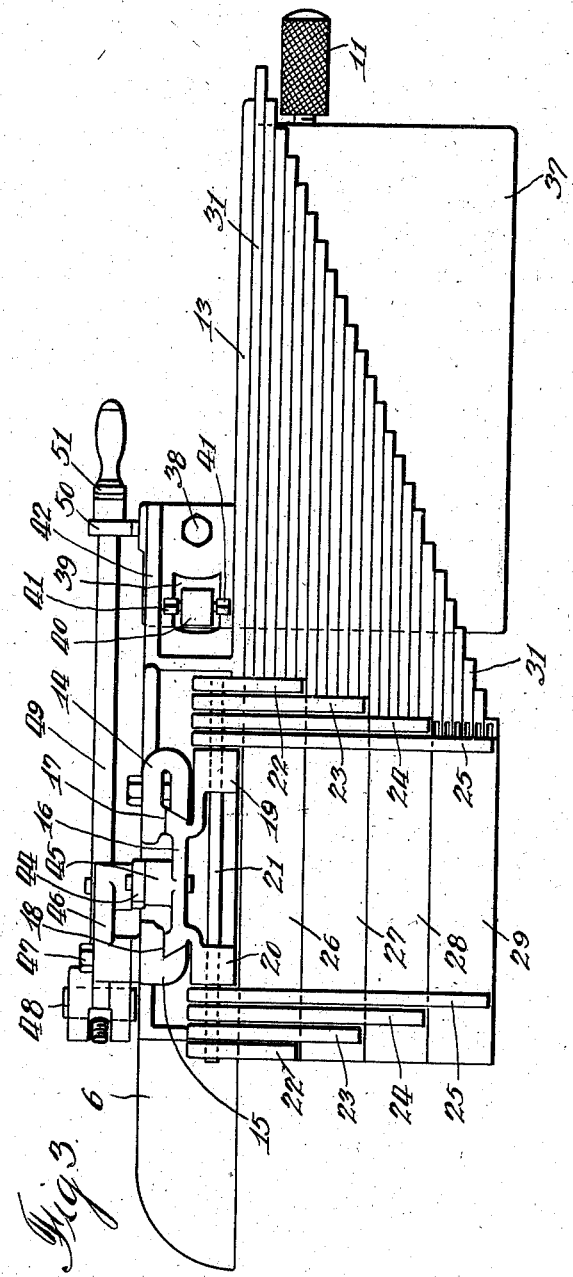
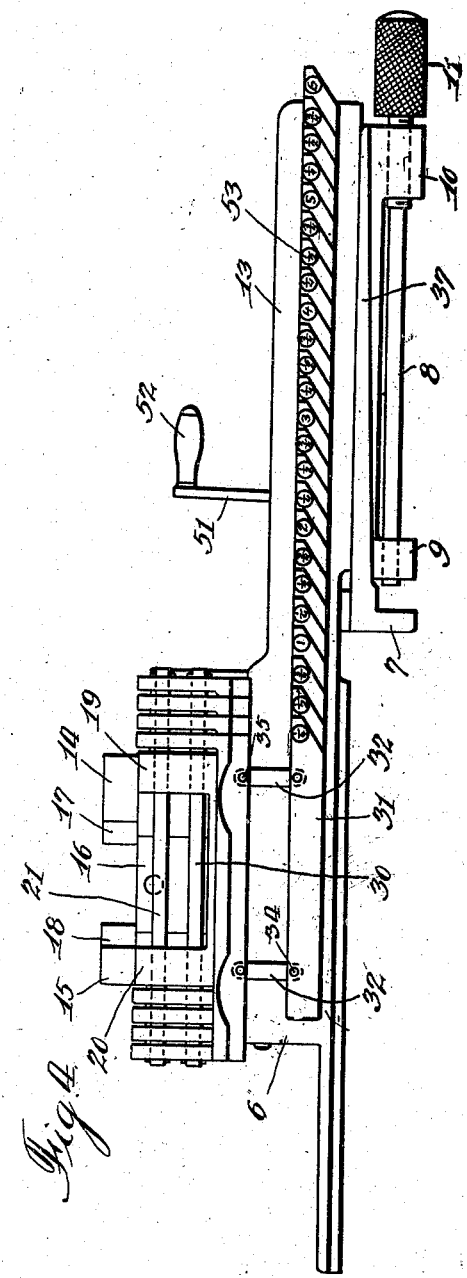
Inventor:
William O. Vivarttas June 10, 1930.  W. O. VIVARTTAS  1,763,333
MULTIPLE GAUGE
Filed May 4, 1927  3 Sheets-Sheet 3
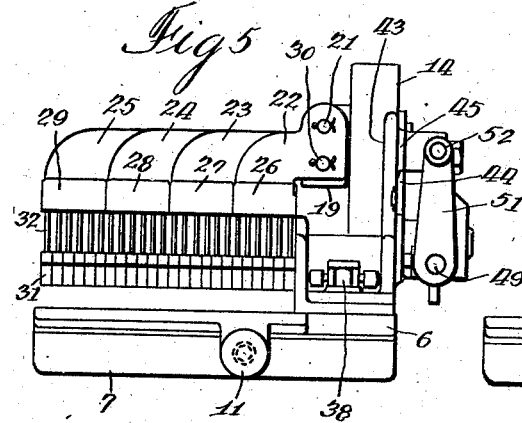
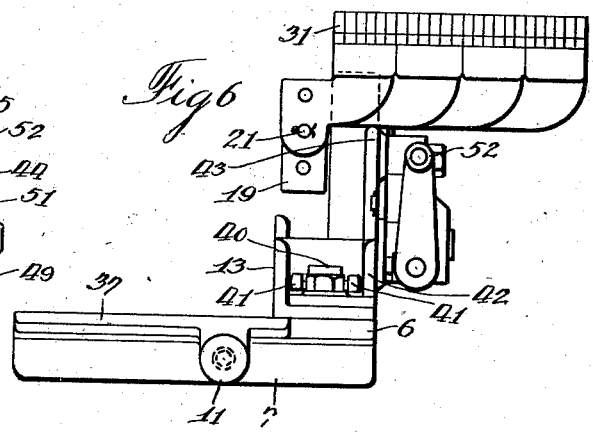
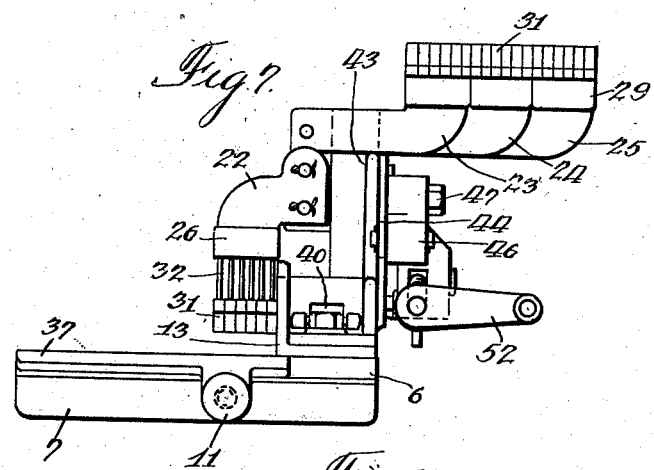
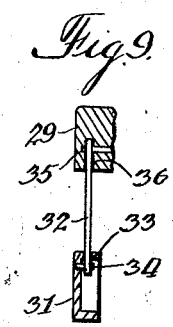
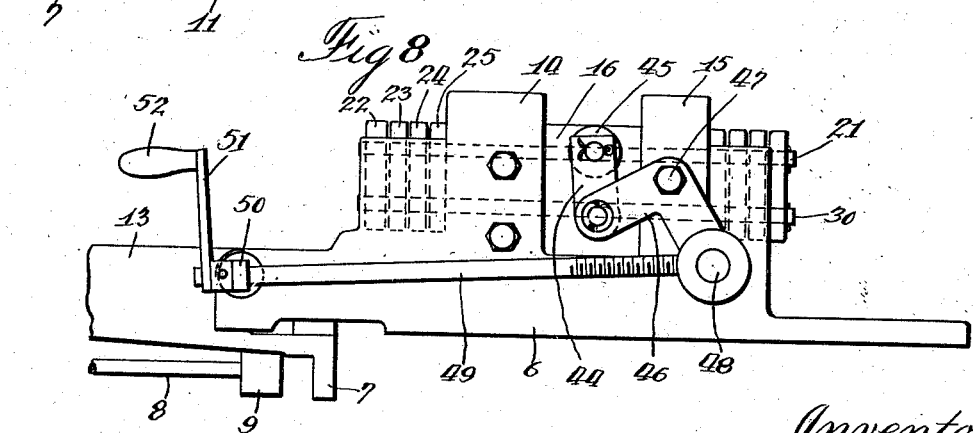

Patented June 10, 1930

1,763,333

UNITED STATES PATENT OFFICE

WILLIAM O. VIVARTTAS, OF ROCKFORD, ILLINOIS, ASSIGNOR TO MATTISON MACHINE WORKS, OF ROCKFORD, ILLINOIS, A CORPORATION OF ILLINOIS

MULTIPLE GAUGE

Application filed May 4, 1927. Serial No. 188,767.

The invention relates to work gauging means for machine tools, and more particularly relates to multiple gauging devices for machines in which the work progresses through the processing mechanism in rectilinear direction.

It is the principle object of this invention to provide a multiple gauging device for selectively determining dimensions of work being processed, in which device any one of a group of gauge members may be selectively used without respect to the order of their selection, and without any manipulation or adjustment of the device.

Another object is to provide a multiple gauging device which is unitary in construction and which may be attached to or incorporated in any standard machine.

A further object is to provide a multiple gauging device having a wide range of selection and in which the gauge members are arranged in separable groups, of which any one or more groups may be moved into operative position, while the other groups are moved away from the path of the work.

Another object is to provide a plurality of selective gauges in association with a rigid gauge bar, the selective gauges being movable out of normal position to expose the operative face of the rigid gauge, which latter is adjustable in position in relation to the processing tool, thus permitting an operator to use either the selective gauges or a rigid gauge accordingly as he is processing pieces of work of successively variable dimensions or of constant dimension.

A further object is to provide a multiple gauging device in which a plurality of gauges are arranged in progressive lateral distances from a processing tool, any one of which gauges may be selected for lateral guiding abutment by the work to be processed, and the others of which are automatically moved out of the path of the work as the latter progresses toward the processing tool.

A further object is to provide a multiple gauge in which a plurality of selective gauging members are arranged in constant interrelation as to the spaces between their respective guiding faces, and which are mounted for adjustment of position, as a whole, in relation to the processing tool and also in relation to the work support, so that work of any width and of any thickness within practical limits may be accommodated thereby.

A further object is to provide a multiple gauge having the characteristics stated, which is constructed in simple arrangement having few and durable parts, and economical of manufacture and maintenance.

Other objects and advantages will be apparent in the following detailed description of a preferred embodiment of the invention, which has been selected for illustration in the accompanying drawings. It will be understood, however, that many changes in form, construction, and arrangement may be made by those skilled in the art without departing from the scope and spirit of the invention as expressed in the appended claims.

In the accompanying drawings, the device is illustrated as adapted to a sawing machine commonly known in the woodworking art as a power driven rip saw. It is desired that the illustration herein be not considered as limiting the adaptation of the device, as it will be obvious that the device may be adapted to any processing machine in which the material being worked is propelled in a rectilinear path into engagement with a processing tool.

Referring to the drawings, Figure 1 represents somewhat diagrammatically a plan view of a commercial rip saw, with the device embodying the present invention shown in position on the work table of the machine.

Fig. 2 is a fragmental front elevation of the machine and device as shown in Fig. 1.

Fig. 3 is a plan view of the device embodying the present invention.

Fig. 4 is a side elevation of the device as illustrated in Fig. 3.

Figs. 5, 6 and 7 are end views of the device with the guiding members in varying positions.

Fig. 8 is a fractional side elevation viewed oppositely to Fig. 4, and particularly illustrating the adjustable mounting for the guide members.

Fig. 9 is a cross-sectional detailed view of one of the guide members and its support.

Generally stated, the device as herein illustrated comprises a base adapted for adjustable attachment to the work supporting table of a machine of the type mentioned, having a rigidly supported gauge bar mounted thereon, and carrying a vertically adjustable support on which is mounted a series of successively positioned, laterally adjacent heads, each head being independently pivoted on the adjustable support and carrying a depending group of parallel selective gauging members having their ends arranged in serial overlapping relation. Each of the selective members is adapted in normal position to guide by abutment a piece of work started in lateral contact with its overlapping end, the member selected determining the distance between the cut to be made by the processing tool and the guided edge of the work. Each member is supported from its overlying head in such manner as to permit the member to be pushed forward out of operative position by the progressing work, when not selected for guidance of the work.

More specifically described, the machine to which the device is herein illustrated as being adapted, comprises essentially a flat topped work table 1 at the approximate center of which is provided a revolving circular saw 2 carried upon an arbor 3 supported and driven in a conventional manner by means not essential to the present description and not herein shown. The work is propelled into engagement with the saw by means of an endless conveyor of which the upper run is illustrated at 4, operating through a suitable opening in the top of the work table. The conveyor 4 is constructed with longitudinal slots 5 provided in each section of the conveyor and into which the saw 2 extends in order to cut through the work being propelled across the table.

The propelling engagement of the conveyor 4 with the work being processed, is maintained by a conventional presser roller mechanism, operative upon the upper surface of the work immediately over the endless conveyor 4. The presser mechanism is not related to the present invention, and is not shown in the illustration herein as it is well known to those familiar with the art.

The device as herein illustrated, comprises a base 6, which, in the type of machine illustrated herein, is adapted to rest upon the work table in adjustable relation thereto. It will be understood, of course, that the manner of attachment of the base to the supporting structure of the machine is immaterial, except that provision for the adjustable positioning of the base in relation to the processing tool is desirable.

In the construction herein illustrated, the under portion of the base 6 is designed to rest upon the flat work table 1, the base being provided on its underside with a clamping device comprising a fixed plate 7 oppositely to which is provided a clamping rod 8 having a sliding bearing in the boss 9 formed on the base and spaced from the plate 7, the clamping rod 8 being forwardly formed with a screw threaded portion having a threaded bearing in another boss 10 formed on the base, and carrying at its extremity a knurled turning knob 11. The clamping plate 7 is positioned for inner engagement with a rail 12 secured to the work table in spaced relation to the front edge, and outwardly clamped by the rod 8, the base 6 being movable laterally across the front of the table to any desired position and secured therein by the means described.

The base 6 is provided with a gauge bar 13 in rigid relation to the base, and preferably formed integral therewith. The gauge bar 13 is positioned in parallel relation to the rectilinear direction of movement of the work toward the saw or other processing tool, and serves as a gauge for determining the width of the work to be cut, and as a lateral guide for starting the work into engagement with the work conveyor. This gauge bar 13 may be positioned in any lateral relation to the processing tool by adjustment of the base as previously described, and as an aid to quickly positioning the gauge bar at any desired distance from the plane of operation of the saw, a scale 14ᵃ may be provided on the front edge of the table, suitably graduated for dimensional readings.

The base 6 is also provided with a pair of spaced standards 14 and 15, between which is supported a vertically adjustable carriage 16, the standards 14 and 15 preferably being provided with conventional V-type sliding ways 17 and 18, within which the suitably formed lateral edges of the carriage 16 are slidably supported. The carriage 16 is provided with a pair of laterally extending brackets, preferably integral with the carriage and terminating in a pair of bearing lugs 19 and 20. Horizontally positioned in the bearing lugs 19 and 20 is a pivot rod 21, upon which is operatively supported a plurality of pairs of laterally extending spaced bracket arms indicated in pairs by 22, 23, 24 and 25. A series of laterally adjacent head blocks 26, 27, 28 and 29 are respectively secured upon the free ends of the respective pairs of brackets. The heads 26 to 29 are normally positioned in substantially horizontal successive arrangement by means of a securing rod 30 extending through the bearing lugs 19 and 20 and through the pivoted ends of the bracket arms, the securing rod 30 being substantially spaced from the pivot rod 21.

Each of the head blocks 26, 27, 28 and 29 carries suspended therefrom a group of elongated gauging members 31, the latter being arranged in parallel relation to each other and parallel to the rigid gauge bar 13. The gauges 31 are preferably arranged also with their outer ends in overlapping relation, that is, each successive gauge extends a substantial distance beyond the gauge immediately outward from it, to form a series of steps exposing the lateral face of the end portion of each of the gauges. The gauges 31 are preferably of uniform width of selected units of measure and lie in successive contact, the innermost of the gauges being in operative contact with the guiding face of the gauge bar 13.

The gauges 31 are supported from their respective head blocks by means of pivoted links 32, a pair of which supports each gauge for independent longitudinal movement from its normal lowermost position to a raised position in abutment with the underside of the head block, and without disturbing their lateral positional arrangement. The gauges 31 are preferably formed in a box-like structure, as illustrated in Fig. 9, the links 32 extending through slots 33 in the upper wall or web of the gauge and pivoted to the side wall of the gauge as indicated at 34. The slots 33 are of sufficient length to permit the links 32 to swing thereinto as the gauges are raised against their head blocks. The links 32 are pivoted at their upper ends, as indicated at 35, in suitable recesses 36 formed in the underside of the head blocks, the recesses 36 being of sufficient length also to permit the swinging in of the links with the raising of the members.

The successively extended front ends of the gauging members 31 overlie a work supporting plate 37, preferably forming a sectional part of the base 6, and positioned with its bearing surface in the same plane with the bearing surface of the machine work table 1. The table portion 37 of the base preferably supports the clamping plate 7 and rod 8 upon its underside. The stationary gauge bar 13 being rigid with the main portion 6 of the base, means for accurately alining the bar on the machine table, after the device is clamped thereto, is provided by adjustably connecting the two sections. A vertically positioned pivot bolt 38 secures an underlying wing of the plate 37 to the main section of the base. The latter is provided with an opening 39 through which extends lug 40 rigid with the plate 37 and laterally spaced from the sides of the opening. A pair of cap screws 41, threaded in opposite sides of the lug 40, are adapted to be adjusted in abutting contact with the rear side of the guide bar 13 and an opposite upstanding portion 42 of the base, thus adjustably locking the two sections in secure relation.

Each of the head blocks 26 to 29 may be independently swung upward on its pivotal support, carrying with it the group of gauges supported thereby to lift the latter out of operative position in relation to the work table, the head block and its respective group of gauges being supported in inoperative position, as indicated in Figs. 6 and 7, by the upper edge of a web 43 formed on the structure of the base 6. Any one or more of the head blocks may thus be thrown back in inoperative position after removing the supporting rod 30 to permit the turning of the bracket arms on the pivot rod 21, the supporting rod 30 being replaced for the support of such of the head blocks as remain in operative position.

The series of gauges 31 are adjustable in their vertical relation to the upper surface of the work table 1 and the auxiliary supporting plate 37 by means of the vertically adjustable carriage 16. The position of the carriage 16 is controlled by any suitable mechanism, that illustrated herein comprising a link 44 pivotally secured to a rearwardly extending lug 45 formed on the carriage 16, the link being oppositely pivoted to one arm of a bell crank 46, the latter being supported on a pivot bolt 47 mounted on the rear side of the standard 15.

The opposite arm of the bell crank 46 is preferably bifurcated to receive a pin 48 having operative bearings in the bifurcated end of the bell crank. The pin 48 is provided between the spaced bifurcated portions of the bell crank arm with a screw threaded cross bore to receive the threaded end portion of an adjusting rod 49 extending frontwardly from the bell crank and supported at its front end in a bearing 50 suitably constructed to prevent longitudinal movement of the rod 49. The outer extremity of the rod 50 carries a crank 51 having a suitable handle 52 for rotating the rod 49 and affecting the vertical adjustment through the carriage 16 of the gauges 31.

In operation, in its adaptation to a sawing machine of the type illustrated herein, the workman adjusts the base on the work table, so that the series of gauges covers the range of widths of the work about to be sawed. The gauges 31 may be conveniently made of one-quarter inch widths and their overlapping exposed ends marked in quarter inches, as indicated at 53 in Fig. 4. In cutting a piece to any desired width, the workman selects the gauge which will give that desired width from the operating plane of the saw, and starts the piece of work on the supporting plate 37 in lateral contact with the overlapping exposed end of the selected gauge, and then pushes the work forward into engagement with the conveyor 4. In the forward movement of the work, all of the gauges outward of the selected gauge will be engaged endwardly by the piece of work as it is propelled forward. Each of the gauges so endwardly engaged will be moved backward and upward to permit the work to pass thereunder as it is guided laterally in abutment with the selected gauge. As the work passes forward out of contact with the gauges, the latter drop back by gravity into normal position.

It will be obvious that the adjustment of the device as a whole across the front of the table will enable the operator to position the device for work of narrow or of great width, and the vertical adjustment of the selective gauges through the carriage 16 permits their accommodation to any thickness of work for which the machine tool is adapted.

It will be obvious also that the device is equally applicable in its operation when adapted to any machine tool for processing any material which progresses in a rectilinear direction and is controlled by lateral guidance.

I claim as my invention:

1. A device of the class described having, in combination, a support, a head movably mounted on said support, and a gauge suspended from said head in position for guiding contact with work to be processed and movable relatively to said head to permit the passage of a work piece, said head being movable on its support to swing said gauge out of normal position.

2. A device of the class described having, in combination, a support, a plurality of heads movably mounted in normal lateral adjacent series, a plurality of longitudinally parallel gauges carried in groups by each of said heads respectively and normally suspended in position for guiding contact by work being processed, each of said heads being independently movable out of normal position to remove its said group of gauges supported thereby from the path of movement of said work.

3. A device of the class described having, in combination, a support, a head, a pair of bracket arms secured to said head and pivoted on said support and adapted to normally retain said head in position over the path of work to be processed, a plurality of longitudinally parallel gauges, independent operative supporting connections between said gauges and said head, said gauges being normally in position for selective lateral engagement by said work and endwardly movable out of the path of said work by contact therewith, said head being swingable on said bracket arms to remove said gauges wholly from the path of movement of said work.

4. A device of the class described having, in combination, a support, a plurality of heads normally arranged in lateral adjacent series respectively, a plurality of groups of gauges carried by said heads, a plurality of pairs of bracket arms pivoted on a common axis on said support, each of said pairs of bracket arms independently supporting one of said heads, means for securing said bracket arms on said support to retain said heads in normal position, said means being releasable to permit the independent swinging of said heads to remove said gauges from normal guiding position.

5. A device of the class described having, in combination, a work supporting plate, an adjustable supporting carriage, a plurality of heads mounted on said carriage in lateral adjacent serial relation, each of said heads independently supporting a group of gauges normally positioned in relation to said plate for lateral guiding contact with work being moved over said plate, said carriage being adjustably movable to vary the distance between said gauges and said plate.

6. A device of the class described having, in combination, an adjustable supporting carriage, a plurality of heads having independent pivoted connection with said carriage and normally arranged in lateral adjacent series, a plurality of gauges supported from said heads in independent groups and in longitudinal parallel relation to said plate, said carriage being adjustable to vary the distance between said gauges and said plate, said heads being independently movable to selectively remove groups of said gauges from normal relation to said plate.

7. A device of the class described having, in combination, a base, a gauge bar rigidly mounted on said base, a plurality of heads operatively supported from said base, and a plurality of gauging members suspended from said heads in longitudinally parallel relation to said gauge bar and swingable by a work piece so as to move relatively to said heads, said heads being operable to remove said gauging members from lateral adjacent relation to said gauge bar.

8. In a device of the class described, a carriage, a pivot rod mounted on said carriage, a plurality of gauge supporting bracket arms pivoted on said pivot rod, said bracket arms and said carriage having alined openings therethrough spaced from said pivot rod, and a removable securing rod selectively positionable in said alined openings to prevent the rotation of said bracket arms on said pivot rod.

9. In a device of the class described, the combination of a base having two sections, one of said sections having a gauge bar mounted thereon and the other of said sections having means for securing said base to a support, a pivot member connecting said sections, a lug formed on one of said sections extending through and spaced from the sides of an opening in the other of said sections, and a pair of oppositely positioned elements having adjustable support in said lug and adapted for abutment with adjacent portions of said other section to adjustably fix the relative position of said two sections.

10. A gauge device of the character described having, in combination, a plurality of heads mounted for independent movement from operative to inoperative position, and a plurality of groups of parallel longitudinal gauges each group mounted on one of said heads, the gauges of each group being suspended from their head by means permitting independent movement of each gauge with relation to the other gauges.

In testimony whereof, I have hereunto affixed my signature.

WILLIAM O. VIVARTTAS.